United States Patent

[11] 3,625,183

| [72] | Inventor | Adolphe Tartar |
| | | Blendecques, (Pas de Calais), France |
| [21] | Appl. No. | 803,671 |
| [22] | Filed | Mar. 3, 1969 |
| [45] | Patented | Dec. 7, 1971 |
| [32] | Priority | Mar. 1, 1968 |
| [33] | | France |
| [31] | | 142,045 |

[54] FEED DISPENSER FOR YOUNG ANIMALS
7 Claims, 2 Drawing Figs.

[52] U.S. Cl. .................................................... 119/51.11,
 119/51
[51] Int. Cl. .................................................... A01k 05/00
[50] Field of Search .................................................... 119/51,
 51.11, 71, 74, 52

[56] References Cited
UNITED STATES PATENTS

| 688,862 | 12/1901 | Kelly | 119/74 |
| 1,783,092 | 11/1930 | Lewis | 119/51 UX |
| 2,563,331 | 8/1951 | Hager | 119/51 |
| 2,929,356 | 3/1960 | Bacigalupo | 119/51 |
| 3,181,505 | 5/1965 | Walraven | 119/51 |
| 3,233,864 | 2/1966 | Behlen et al. | 119/51 X |
| 3,265,036 | 8/1966 | Kloss | 119/51 |

Primary Examiner—Hugh R. Chamblee
Attorneys—Robert E. Burns and Emmanuel J. Lobato ABSTRACT: An apparatus for dispensing artificial food to young animals, which comprises a mixing vessel in which predetermined amounts of warm water and nutritive powder are delivered from a warm-water tank and a powder storage hopper, respectively, characterized in that the outlet of the mixing vessel is connected in parallel to separate troughs in which animals divided into groups requiring different food supplies can feed themselves, and that each supply line connecting said outlet of said mixing vessel to a trough has inserted therein a gaged-orifice device controlling the output of liquid food delivered to said pipeline.

PATENTED DEC 7 1971 3,625,183

INVENTOR:
ADOLPHE TARTAR
BY
Amster & Rothstein
ATTORNEYS

3,625,183

FEED DISPENSER FOR YOUNG ANIMALS

BACKGROUND OF THE INVENTION

The present invention relates to improvements in or relating to apparatus for dispensing artificial food to young animals.

Apparatus of this general type are already known which comprise essentially a warm-water tank, a hopper for storing powdered food (e.g. powdered milk) and a mixing vessel in which predetermined amounts of warm water and nutritive powder are introduced and mixed for producing a liquid food subsequently delivered to the animals.

SUMMARY OF THE INVENTION

The present invention is concerned more particularly with an improvement brought to an apparatus of this character with a view to ensure a rational distribution of food from a same apparatus to groups of animals differing for example by their age and number.

To this end, the artificial food dispenser for young animals according to the present invention, which comprises a mixing vessel in which predetermined amounts of warm water and powdered food are introduced from a warm-water tank and a powder storage hopper, respectively, is characterized in that the outlet of said mixing vessel is connected in parallel to separate troughs from which the animals divided into groups requiring different foods can feed themselves, and that a gauged-passage device is inserted in each pipeline connecting the outlet of said mixing vessel to a specific trough for controlling the liquid food throughput in said line.

Thus, by properly selecting the gauged orifices of the various devices controlling the food throughput in the dispensing pipeline it is possible at any time to discerningly distribute the total volume of liquid food prepared in said mixing vessel among the various troughs. Under these conditions, a single and same dispensing apparatus can be used for rationally supplying food to different groups of animals.

According to another feature characterizing this invention, said nutritive powder storing hopper having a metering Archimedean screw rotatably driven from an electric motor disposed in its lower portion comprises an oscillating member overlying, and oscillated by, said screw.

The movement of said oscillating member disposed in the lower portion of said storage hopper will thus prevent the undesired formation of a vault in the mass of powder to be stored therein, thus affording a reliable supply of powdered food to the metering Archimedean screw.

BRIEF DESCRIPTION OF THE DRAWING

A typical form of embodiment of this invention will now be described by way of example with reference to the accompanying drawing, in which.

DESCRIPTION OF THE PREFERRED EMBODIMENT

Figure 1:
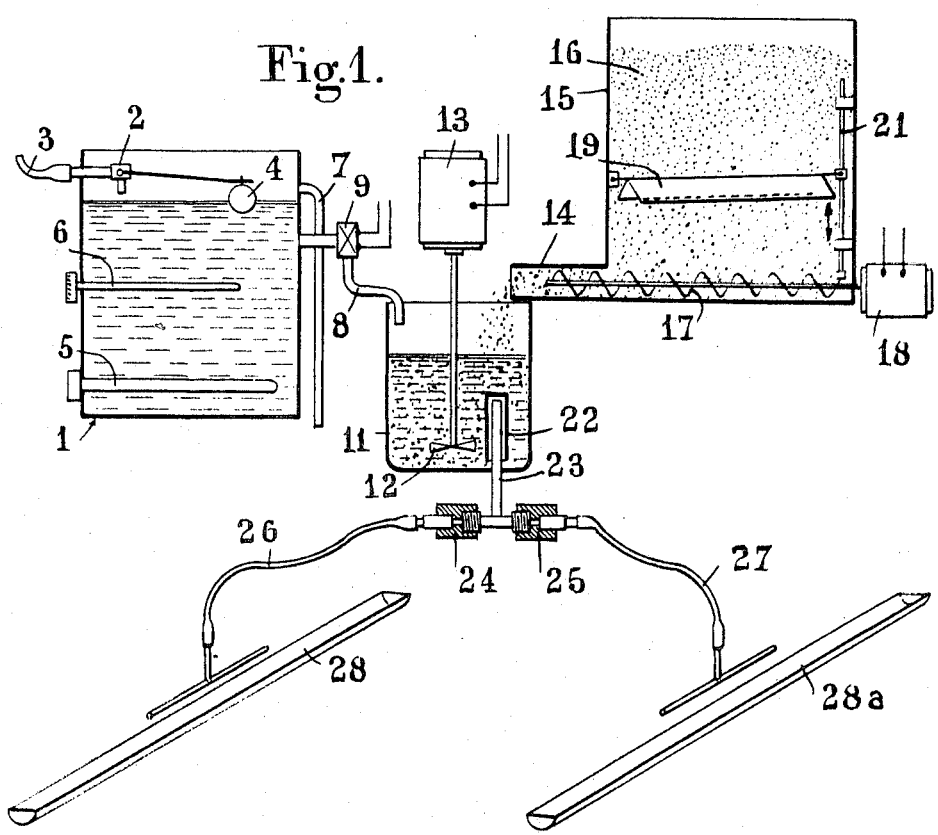
FIG. 1 is a diagrammatic view showing an artificial food dispensing apparatus for young animals, constructed according to the teachings of this invention.

The apparatus according to this invention comprises a water heater 1 of the constant-level type, equipped with a valve 2 connected to a water supply by means of a hose or pipeline 3, said valve 2 being responsive to a float 4. This water heater further comprises a plunger-type heater element 5 and a thermostat 6. It also comprises an overflow pipe 7 and a warm-water outlet pipe line 8 having an electrically operated valve 9 inserted therein. This warm-water pipeline 8 opens into the upper portion of a mixing vessel 11 equipped with a stirrer 12 rotatably solid with the shaft of an electric motor 13.

Overlying the mixing vessel 11 is the outlet orifice of a duct 14 connected to the bottom of a supply hopper 15 filled with a powdered product 16 constituting the basic element of the artificial food to be dispensed (e.g. powdered milk).

The powdered food 16 is introduced into the vessel 11 by means of an Archimedean screw 17 disposed near the bottom of said hopper 15 and having its outer end engaged into said outlet duct 14. This Archimedean screw 17 is rotatably driven from a motor and reducing gearing unit 18.

Within the hopper 15 a device designed for preventing the powdered food to form a vault in the hopper and thus affording a perfect feeding of the Archimedean metering screw 17 is provided. This device comprises an oscillating member 19 consisting of a folded metal sheet of substantially dihedral configuration having its vertex directed upwards. This dihedral member 19 has one end suspended from the registering wall of the hopper and the opposite end rigid with a vertical rod 21 slidably mounted along the adjacent wall of the hopper, as shown. This rod 21 rests with its lower end upon a flat face provided on the last inner turn of the Archimedean screw 17, whereby the rod 21 is reciprocated vertically and causes the oscillatory motion of said sheet 19. Thus, any vault formation within the mass of powdered product 16 is safely prevented.

The warm water and the powdered food are thus introduced into the mixing vessel 11 and stirred therein by the stirrer 12 rotatably driven from motor 13. This vessel 11 comprises a siphon-type outlet 22 having a T-shaped extension, and each arm of the T has screwed thereon a gauged-passage device 24, 25 (for example in the form of a pair of internally gauged jets or sockets). These gauged-passage devices 24 and 25 are connected through pipelines 26 and 27 to at least two troughs 28 and 28a and their function consists in delivering into these troughs different volumes of reconstituted milk, with due consideration for the number and age of the animals to be fed by means of each trough.

A system comprising a plurality of branch lines (for example four or six) each equipped with an interchangeable gauged-passage device adapted to be modified as a function of the age and number of the animals to be fed (for example according to the number of pigs in a farrow) may also be provided. A proper operation of a simple device of this type cannot be obtained unless the output through the siphon 22 is constantly at least equal to the sum of the outputs of the gauged distribution orifices such as through devices 24 and 25.

According to modified form of embodiment of the apparatus constituting the subject matter of this invention the apparatus comprises, downstream of the mixing vessel 11 (of larger dimensions), a valve assembly responsive to a programmer, adapted to distribute the fattening food for example to all the pigs of a pigsty. In this case it is only necessary to associate with this device a pump disposed between the mixing vessel or container 11 and the set of electric distributor valves. The pressure produced by the pump will thus relieve the owner from all distribution problems by gravity and facilitates the efficient rinsing of the piping by pressure fluid.

Figure 2:
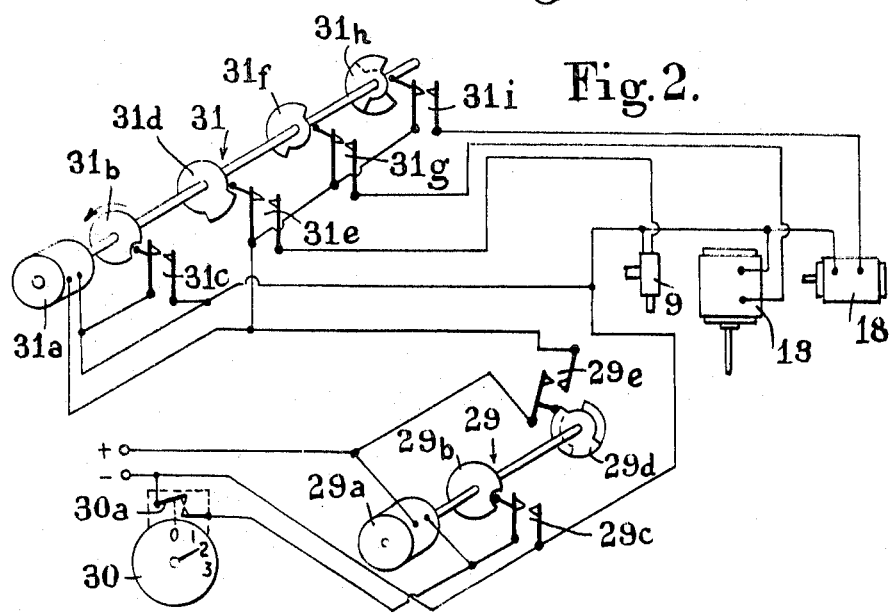
FIG. 2 is a diagram illustrating the mode of operation of the electrical equipment of said apparatus.

Now the electrical control system of the apparatus of this invention will be described with reference to FIG. 2. This system comprises essentially an electric clock 30 and a pair of controllers 29 and 31.

The electric clock 30 comprises an index adapted to be preset as a function of the food requirements of the animals with a view to determine the frequency of the drinking periods of the animals, i.e. of the operations of the apparatus.

The controller 29 sets the number of cycles necessary for reconstituting the milk or other liquid food. This controller comprises an electric motor 29a connected to a normally open or front contact 30a of said clock 30. This contact 30a is adapted to be closed at timed intervals depending on the setting of the clock index, for example every other hour. Each time the front contact 30a is closed the motor 29a of controller 29 is started and remains energized during a predetermined time period, for example a 10-minute period, by a self-energizing cam 29b acting upon a holding contact 29c. The controller 29 comprises a second variable cam 29d controlling a contact 29e.

This last-named contact 29e controls the energization of the motor 31a of the other controller 31. The variable cam 29d permits of closing contact 29e during a time period adjustable from 0 to 5 minutes, for example, i.e. half the period necessary for the controller 29 to perform a full revolution, since the variable cam 29d is operative through an arc not exceeding 180°.

The variable cam 29d is adjustable for example by means of a handwheel disposed externally of the apparatus. A number of reference marks are carried by this handwheel at spaced intervals corresponding each for example to a 10-minute period or to a complete cycle of the other controller 31. Assuming for example that the index rigid with the external handwheel of this cam were set in the position registering with reference mark "4," the apparatus will operate during four cycles of controller 31. Under these conditions, the highest number of cycles per period of operation will be 30 in this specific example.

The controller 31 having a rotational cycle of, say, 10 seconds, comprises a motor 31a rotatably driving three constant-contour cams 31b, 31d, 31f and a variable cam 31h controlling contacts 31c, 31e, 31g and 31i, respectively.

Cam 31b is a self-energizing cam adapted to close contact 31c during a complete revolution of motor 31a, which corresponds to a 10-second cycle.

Contacts 31e, 31g and 31i are connected to the electric valve 9, motor 13 of stirrer 12 and motor 18 of Archimedean screw 17, respectively. The closing of contact 31e will open the electric valve 9 during a fixed time period; the closing of contact 31g will cause the energization and starting of motor 13 also during a predetermined and fixed time period, and the closing of contact 31i causes the motor 18 to operate during a more or less prolonged time period according to the setting of cam 31h, thus involving a modification in the concentration of dry or powdered substance of the mixture formed in the vessel 11, as desired by the stock brooder. To this end the cam 31h is rigid with an adjustment knob accessible to the user.

Thus, when controller 31 is started, when contact 29e is closed the opening of the electric valve 9 is attended by the fall, into the mixing vessel 11, of a quantity of powdered food depending on the setting of cam 31h, and starting the motor 13 will cause the mixture to be stirred.

The liquid mixture thus formed is distributed by the siphon 22 each time the volume of liquid mixture in the vessel 11 exceeds the level of siphon 22.

The gauged orifices of devices 24 and 25 inserted in pipe lines 26 and 27 supplying the troughs determine the fractions of each amount of liquid food directed into each trough. Upon completion of a cycle of operation of controller 31 another cycle is resumed and so forth until contact 29a is closed again.

Of course, the specific form of embodiment of the invention which is described hereinabove with reference to the attached drawing should not be construed as limiting the scope of the invention since many modifications may be brought thereto without departing from the basic principles of the invention as set forth in the appended claims.

What I claim is:

1. Apparatus for dispensing liquid feed to animals, comprising a mixing vessel, means for supplying water to said mixing vessel at a selected rate, means for supplying powdered food to said mixing vessel at a selected rate, said powdered food supplying means comprising a hopper, a conveyor screw in the lower portion of said hopper for conveying said powdered food from said hopper to said mixing vessel, means for rotating said screw, an elongated oscillating member overlying said conveyor screw, means suspending one end of said oscillating member from a wall of said hopper, a vertically reciprocating slide rod connected with the opposite end of said oscillating member, and means on said conveyor screw for reciprocating said slide rod to oscillate said oscillating member, means in said mixing vessel for mixing said water and food to produce a liquid feed, a plurality of discrete feed troughs for feeding groups of animals requiring different quantities of food, an outlet passage for said mixing vessel, branch lines extending from said outlet passage to each of said troughs respectively, a gauged orifice device controlling the flow of said liquid feed through each of said branch lines to the respective trough and means for maintaining at said outlet passage a selected pressure to supply simultaneously to said troughs different quantities of feed determined by said gauged orifices respectively.

2. Apparatus according to claim 1, in which said means for reciprocating said slide rod comprises a flat face provided on the last turn of said conveyor screw, the lower end of said slide rod resting on said flat face and being reciprocated thereby on rotation of said screw.

3. Apparatus for dispensing liquid feed to animals comprising a mixing vessel, means for periodically supplying a predetermined amount of water to said mixing vessel, means for periodically supplying predetermined amount of powdered food to said mixing vessel, means in said mixing vessel for mixing said water and food to produce a liquid feed, a plurality of discrete feed troughs for feeding groups of animals requiring different quantities of food, an outlet for said mixing vessel, branch lines extending from said outlet to each of said troughs respectively, and a gauged orifice device in each of said branch lines controlling the flow of said liquid feed through the respective line to the respective trough, said outlet comprising a siphon at the bottom of said mixing vessel, said siphon initiating supply of liquid feed to said branch lines when the liquid feed in said mixing chamber rises to a selected first level and continuing supply of liquid feed to said branch lines until said liquid feed in said mixing vessel falls to a selected lower level, the output capacity of said siphon being at least as great as the sum of the outputs of said branch lines.

4. Apparatus according to claim 3, in which said means for supplying powdered food comprises a hopper, a conveyor screw in said hopper for conveying said powdered food from said hopper to said mixing vessel, means for rotating said screw, an oscillating member overlying said conveyor screw, means connecting said oscillating member with said screw and means on said screw for oscillating said oscillating member.

5. Apparatus according to claim 3, in which said means for supplying water comprises a tank, float controlled means controlling admission of water to said tank from a water supply to maintain a predetermined liquid level in said tank, means for heating water in said tank, conduit means connecting an upper portion of said tank with said mixing vessel and electrical valve means controlling flow of water through said conduit means from said tank to said mixing vessel.

6. Apparatus according to claim 3, comprising an electrical control system controlling the supply of water and powdered food respectively to said mixing vessel and the operation of said mixing means, said control system comprising a first controller, comprising a motor and a plurality of cams controlling the cycle of operation of said water and food supply and said mixing means, a second controller comprising a motor and a cam controlling the motor of said first controller to determine the number of successive cycles of operation of said first controller and a time clock controlling the motor of said second controller to determine the intervals between successive operations of said second controller.

7. Apparatus for dispensing liquid feed to animals, comprising a warm-water tank, a hopper for storing powdered food to be mixed with water for preparing liquid feed, a mixing vessel in which predetermined amounts of warm water and powdered food are delivered, a plurality of discrete troughs each communicating with an outlet from the mixing vessel by means of pipelines, from which troughs animals divided into groups requiring different quantities of food can feed themselves and a gauged-orifice device for controlling the output of liquid feed which flows through each of the pipelines connecting said mixing vessel to said troughs, a siphon arranged at the bottom of said mixing vessel, which siphon forms the outlet from the mixing vessel and communicates with each of the pipelines, a conveyor screw disposed in the lower portion of said powdered food hopper, an electric motor for rotatably driving said conveyor screw, and an oscillating member overlying said conveyor screw, the oscillatory motion of said member being derived from the rotation of said conveyor screw, a warm-water electric valve and a motor for stirring the mixture, and an electrical control system comprising an electric clock and two controllers each comprising an electric motor adapted rotatably to drive a plurality of cams including a cam for self-energizing said motor, said clock controlling a predetermined time intervals the starting of a first controller comprising a first variable-contour cam for energizing the motor of the second controller during a first predetermined time period adjustable by means of said first variable-contour cam acting upon contacts controlling the energization of said warm-water electric valve and the motor for stirring the mixture, and another variable-contour cam controlling the energization of the motor driving said metering conveyor screw during a predetermined and adjustable time period during each cycle of operation.

* * * * *